United States Patent [19]

Gougeon et al.

[11] Patent Number: 4,474,536
[45] Date of Patent: Oct. 2, 1984

[54] WIND TURBINE BLADE JOINT ASSEMBLY AND METHOD OF MAKING WIND TURBINE BLADES

[75] Inventors: Meade A. Gougeon; Jan C. Gougeon, both of Bay City, Mich.

[73] Assignee: Gougeon Brothers, Inc., Bay City, Mich.

[21] Appl. No.: 138,659

[22] Filed: Apr. 9, 1980

[51] Int. Cl.³ .............................................. B63H 1/26
[52] U.S. Cl. ................................ 416/226; 416/213 A; 416/229 R; 144/346; 144/350; 403/292; 403/294; 244/131
[58] Field of Search ............... 416/226, 229 R, 229 A, 416/213 A; 52/417; 144/346, 353, 371, 377, 350; 403/292, 293, 294, 375; 244/131

[56] References Cited

U.S. PATENT DOCUMENTS

| | | | |
|---|---|---|---|
| 0,497,915 | 5/1893 | Fulghum et al. | 403/294 |
| 2,125,882 | 8/1938 | Berliner | 244/131 X |
| 2,734,586 | 2/1956 | Wright et al. | 416/226 |
| 3,094,747 | 6/1963 | Hess | 144/346 X |
| 3,469,865 | 9/1969 | Ellenburg | 403/294 X |
| 3,647,318 | 3/1972 | Pehrsson et al. | 416/213 A X |

FOREIGN PATENT DOCUMENTS

| | | | |
|---|---|---|---|
| 1811010 | 5/1970 | Fed. Rep. of Germany | 403/292 |
| 510212 | 11/1920 | France | 244/131 |
| 903214 | 9/1945 | France | 244/131 |
| 707620 | 4/1954 | United Kingdom | 416/226 |

Primary Examiner—Harvey C. Hornsby
Assistant Examiner—Christine A. Peterson
Attorney, Agent, or Firm—Learman & McCulloch

[57] ABSTRACT

Hollow wind turbine blades and the like comprising abutting blade sections, with nose forming strips and converging walls forming a tail section connecting with the ends of the nose forming strips, and a method of fabricating them comprising machining the facial end walls of the abutting blade sections to provide a precise alignment thereof providing a flush joint when the sections are butted together, adhesively bonding the blade sections in abutting relation and permitting the bond to cure, cutting communicating splice receiving slots in the abutting nose forming strips, and inserting adhesively bonding splice inserts which fit the slots in place in the slots.

15 Claims, 9 Drawing Figures

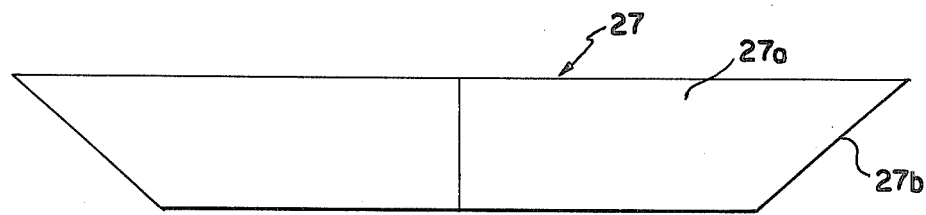
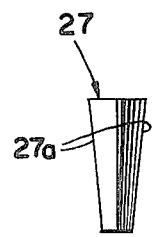
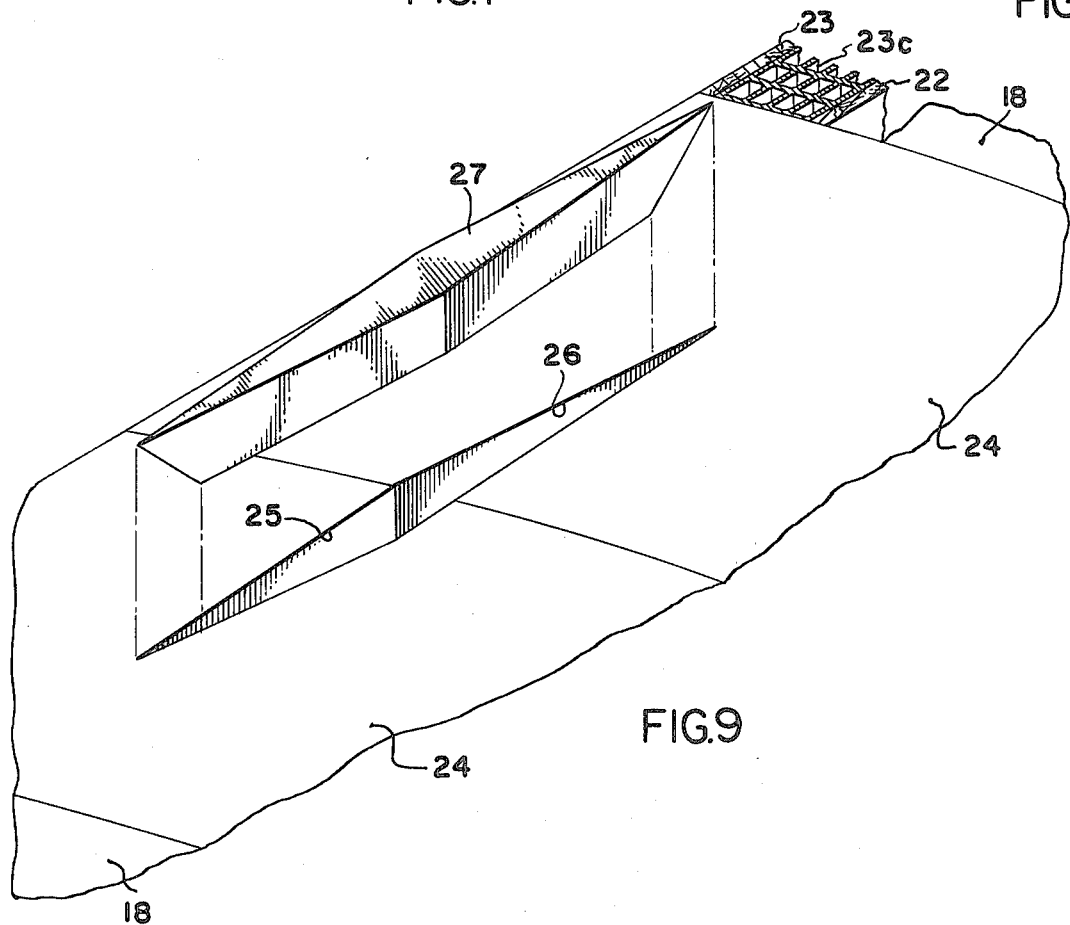

WIND TURBINE BLADE JOINT ASSEMBLY AND METHOD OF MAKING WIND TURBINE BLADES

BACKGROUND OF THE INVENTION

With the present emphasis on conserving energy and producing energy from alternative sources such as wind power, the need has arisen for extremely large wind turbine constructions of a character which employ blades in lengths of 175 feet or more. Such blades can be conveniently and economically fabricated from a wood resin composite, which is not subject to the same fatigue problems as are blades fashioned from metal and other materials. With blades of the length mentioned, it is convenient and economical to manufacture the blades in sections which can be separately shipped to distant locations and then joined together at the wind turbine site.

The present invention is particularly concerned with an in-the-field method of joining the sections of a wood structure wind turbine blade and the novel wind turbine blade joint which is employed. The joints illustrated in the following listed patents are illustrative of joints which have been used to join various members, but these are not considered satisfactory for the purpose of the present invention:

U.S. Pat. No. 201,378
U.S. Pat. No. 1,353,895
U.S. Pat. No. 1,409,410
U.S. Pat. No. 3,094,747.

One of the prime objects of the invention is to design a wind turbine blade assembly of the character described, and a method of joining blade sections in the field which does not increase the girth of the blade or necessitate any protuberance on the blade structure.

A further object of the invention is to design a blade structure and method of the character described which, in an economic and reliable manner, provides the strength required to withstand the compression and tension stresses to which the blade is subject.

More specifically, an extremely important object of the invention is to provide a blade assembly made up of abutting sections which are joined in a manner to enhance the transfer of blade tension, as well as compression stresses so that the entire monolithic blade resists bending and torsional stresses applied to any blade section.

Still a further object of the invention is to design a light wind turbine blade of relatively low density which provides good buckling strength for the walls of the blade structure and has good physical properties on a weight per unit of length basis sufficient to provide a reasonably light blade which is still strong and stiff enough to meet operational requirements.

Still a further object of the invention is to provide a blade structure which can be readily fabricated of an ecologically and domestically available material which has an excellent fatigue life.

Other objects and advantages of the invention will be pointed out specifically or will become apparent from the following description when it is considered in conjunction with the appended claims and the accompanying drawings, wherein:

FIG. 6 is an enlarged top plan view illustrating the nature of the splice insert which is used in the nose portion of the joint assembly disclosed in FIG. 2;

FIG. 7 is a side elevational view thereof;

FIG. 8 is an end elevational view thereof; and

FIG. 9 is an enlarged, perspective, fragmentary, elevational view similar to FIG. 2, and illustrating a tail section with a splice insert which may be used in the tail portion of the blade assembly.

Figure 1:
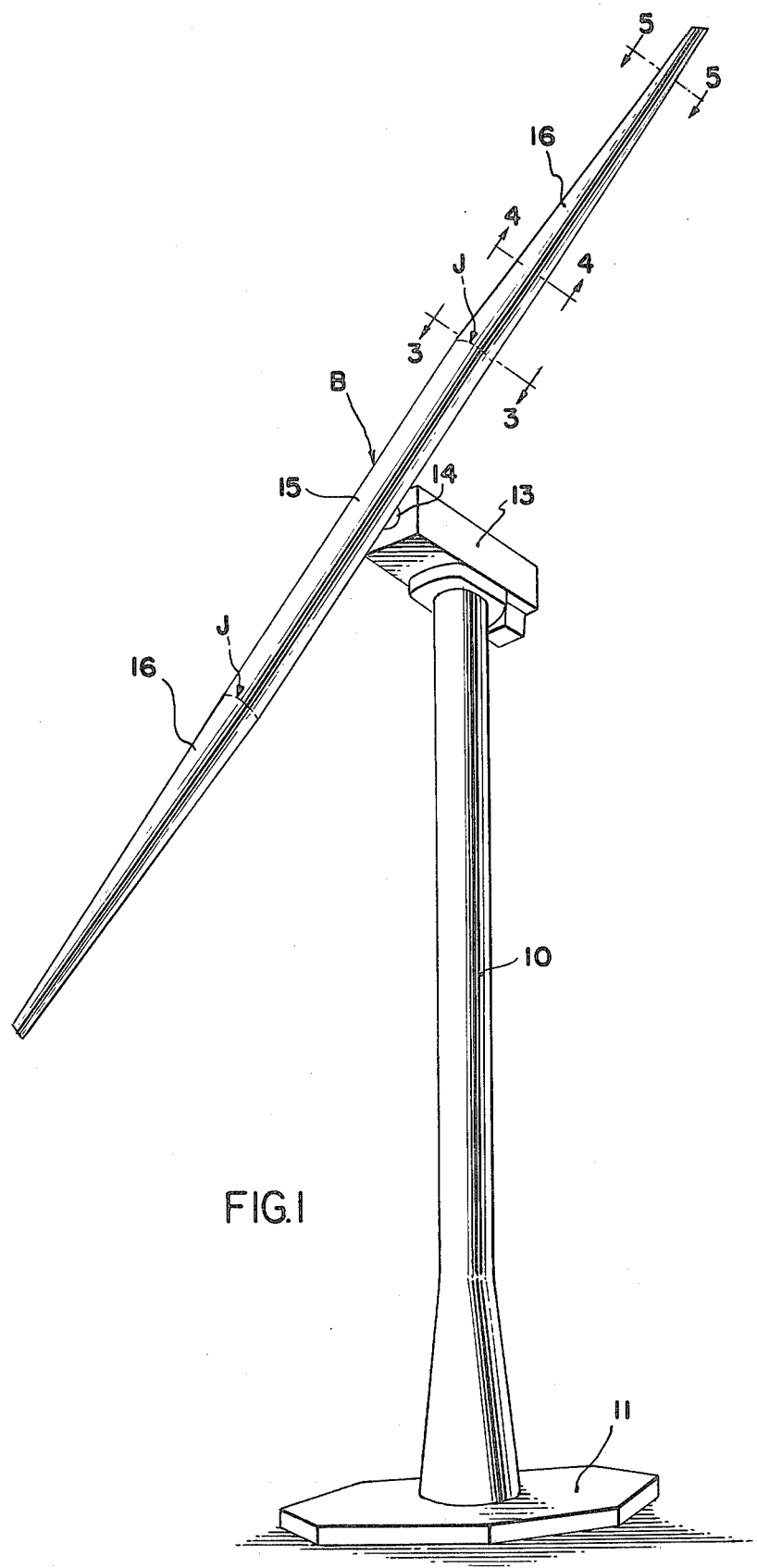
FIG. 1 is a perspective elevational view of a typical wind turbine construction.

Referring now more particularly to the accompanying drawings and in the first instance to FIG. 1, a wind turbine tower 10 is illustrated as supported on a concrete or other base 11. Mounted atop tower 10 is the mount 13 for journaling the shaft 14 on which the turbine blade, generally designated B, is fixedly mounted. The mount or housing 13 may also be employed to house the generator or other equipment provided to create electrical power as a result of rotation of blade B due to wind forces.

As FIG. 1 indicates, blade B can be made up of a central section 15 which is secured to the shaft 14 in any acceptable manner, such as bolting, and uniformly tapering end sections 16. Because of the extreme length of these long and sizeable blades B, the end sections 16 and mid section 15 are separately shipped to the wind turbine site, and are assembled prior to the time the entire blade assembly B is secured to shaft 14. In this procedure, the end walls of each of the blades 16 are first of all butt-joined in flush relationship to the end walls of the central section 15 to form the butt joint, generally designated J.

Figure 3:
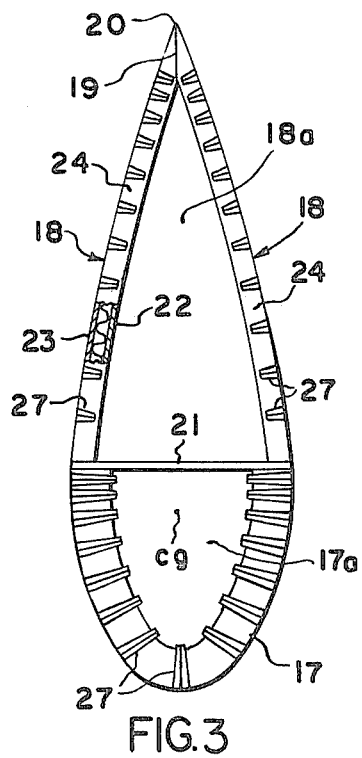
FIG. 3 is an enlarged, sectional, elevational view taken on the line 3—3 of FIG. 1 and illustrating a blade section end wall.
Figure 4:
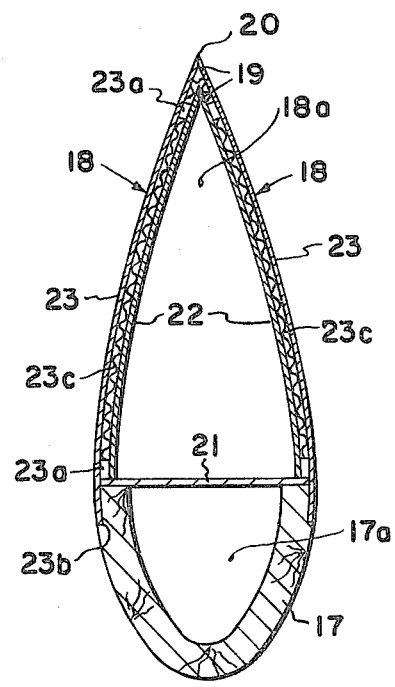
FIG. 4 is a similar cross-sectional view taken on the line 4—4 of FIG. 1.
Figure 5:
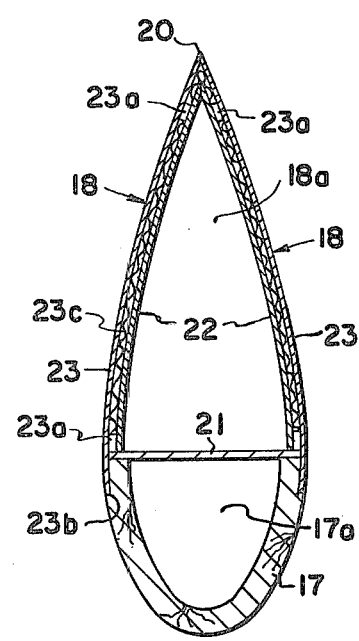
FIG. 5 is a similar cross-sectional view taken along the line 5—5 of FIG. 1.

As FIGS. 3 through 5 indicate, the hollow blade sections 15 and 16, which may be described as generally of tear-drop configuration, are typically formed with a hemi-ellipsoidal-shaped nose part 17, and trailing side walls 18 which join together at 19 to define a trailing edge 20. The blade sections are hollow at 17a and 18a and the center of gravity of the blade sections is indicated at c.g. The abutting identical end wall surfaces of both the blade sections 15 and 16 are disclosed particularly by FIG. 3, and it is to be understood that these surfaces are machined to such tolerances that an extremely good, perpendicular butting alignment is secured at joint J.

The hollow nose sections 17, which constitute the main load bearing portions of the blade sections 15 and 16 and extend the full length thereof, comprise layers of wood veneer formed to the horseshoe configuration shown and bonded together with an epoxy resin or other suitable adhesive. The West System Epoxy, available from Gougeon Brothers, Inc. of Bay City, Mich., United States is a typical catalytic action thermoset plastic which is well suited to the saturation bonding of such wood veneers. Additional adhesives for bonding wood veneer strips are disclosed in aforementioned U.S. Pat. No. 3,094,747.

Also provided in the blade is an interior adhesively bonded wood veneer, shear web 21 extending from one end of the sections 15 and 16 to the other and adhesively joined to the nose ends 17 to span those ends and form essentially a D-shaped section. The side walls 18 throughout most of their length are made up of inner plies 22 and outer plies 23 (see FIGS. 3 and 4), joined in spaced apart relation by adhesively secured spacer blocks 23a. The ends of plies 23 are received in recessed shoulders 23b provided in the nose pieces 17. A honeycomb core material structure, typically phenolic resin impregnated paper, for example, is provided in the spaces between plies 22 and 23 as shown at 23c. At the abutting faces of sections 15 and 16, wood veneer end faces 24 (FIG. 3) are adhesively bonded to the plies 22 and 23 and the shear web 21. The exterior of blade sections 15 and 16 is provided with a smooth outer skin S which typically can comprise several coats of epoxy adhesive.

In terms of manufacture, the blades 15 and 16 are normally made in two parts and their end surfaces are machined and fitted to a precise alignment which provides the end faces, comprising parts 17, 21, and 24, with a flush fit. At the site, the abutting faces are clamped and adhesively secured together with the adhesive mentioned and, after curing and setting of the adhesive has taken place, the pair of grooves 25 and 26 are cut in sections 15 and 16 respectively, around the circumference of nose pieces 17 and tail walls 24. The cutout sections 15 and 16, which as FIG. 3 indicates, typically extend entirely through the horseshoe-shaped sections 17, but not entirely through walls 24, to form diamond-shaped recesses for receiving load transmitting wood block splice inserts 27. The greater concentration of these keys 27 is in the ends of the nose section 17 as shown in FIG. 3. The diamond-shaped openings are cut in the monolithic blade structure using, typically, a drilling operation, followed by a slotting operation which cuts very accurate slots in the blade wall surfaces. It has been determined that the length l of each half of the double tapered slot should be at least eight, but preferably twelve times, its center width, and, as indicated in FIG. 8, the sides 27a of the inserts 27 should also uniformly taper from top to bottom between about 2° and 5°. Further, the end walls 27b are convergent, as shown in FIG. 7. The purpose of the joint structure is to achieve as close to one hundred percent load transfer capability as possible under normal, cycling-load, wind-turbine-blade-fatigue-load conditions. When the end faces of sections 15 and 16 are adhesively bonded, load transfer between them is about one hundred percent in compression, but only about thirty percent in tension. When the wedge inserts 27 are employed, the load transfer capability in tension is greatly improved and is expected to reach close to ninety percent. Thus, bending stresses on a blade section are resisted by the entire monolithic blade structure and not just one of its sections.

Figure 2:
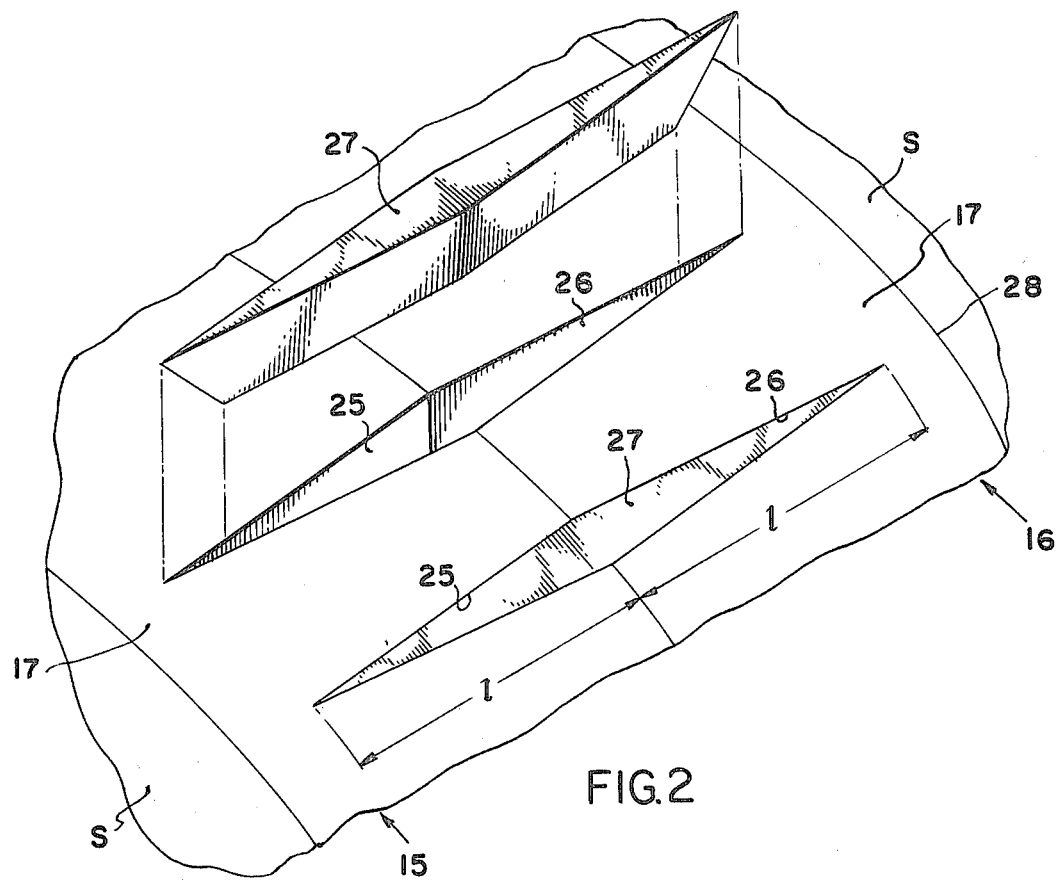
FIG. 2 is a considerably enlarged, fragmentary view, also of a perspective elevational nature, illustrating a part of the nose portion of abutting blade sections and the method of joining abutting wind turbine blade sections.

With the wedge angles of sides 27a and ends 27b, an adequate bonding pressure, for purposes of adhesively bonding the splices in position without clamps, can be achieved by simply tapping the pre-cut wood splice pieces 27 into position in the receiving slots (25-26), after administering the epoxy or other suitable adhesive to the slot surfaces and the wood splice pieces to be installed. While the splices and slots 25-26 are provided to close tolerance, the viscous adhesive fills any minute voids or gaps and, after the wood splice pieces are gently tapped into position, the structure is allowed to cure in place. As delivered to the site, the abutting end sections 15 and 16 are covered with the skin S only to the location 28 (FIG. 2). Thus, after smoothing down the splice surface area, a final step is the application of a protective surfacing material such as the epoxy mentioned to complete the skin S at the joint area.

The splice inserts 27, which are of greater density than the parts they join, may be, and in FIG. 3 are shown as, used over the entire perimeter of the blade section abutting end surface area, including the tail area in a number and concentration which depends on the stresses to be encountered. At the tail, the greater concentration is near the trailing edge 20. It is important that the splice inserts 27 not subject the wood inserts to shear forces such as would be the case if the inserts were hourglass-shaped, wood being much more likely to fail in shear than in compression and tension.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. In a wind turbine, an elongate, tubular, essentially wood-resin composite material blade assembly secured on a wind turbine shaft and having at least a pair of essentially hollow sections with abutting ends and comprising in cross-section a nose strip part with spaced apart ends and convergent trailing edge walls forming a tail portion; the abutting section ends having an adhesive spread thereon and being adhesively bonded in an abutting matched relationship in which identically exteriorly configured abutting nose portions mate with one another, and identically exteriorly configured abutting tail sections also mate to provide a smooth surfaced essentially hollow monolithic body; axially communicating convergent axially extending slots with smooth surfaced side walls cut in the abutting blade sections after the adhesive bonding thereof in perimetrally spaced relation around the perimeters of the abutting nose and tail portions of the mating sections to form mating slots of a length at least eight times their width in the mating sections; splice inserts fitting said slots and adhesively resin bonded therein in flush relation with the perimeters.

2. The blade assembly of claim 1 wherein the nose portions in section include a curved end with divergent legs and said slots and splices are more concentrated and less spaced apart in the spaced apart legs of the nose strip portions than in the curved ends.

3. The blade assembly of claim 1 wherein the insert splices are generally diamond-shaped.

4. The blade assembly of claim 1 wherein the slots extend cross-wisely completely through the nose strip portions and the splices fill the slots.

5. The blade assembly of claim 1 wherein the splices have inwardly tapered sides and ends and the slots have matching surfaces.

6. The blade assembly of claim 1 wherein the slots and inserts are also provided in the tail portions, but do not extend completly crosswisely through them and terminate short of their interior surfaces.

7. The blade assembly of claim 1 wherein the nose portions extend substantially the length of the blade sections and a shear web connecting the ends of the nose portions also extends substantially the length of the blade sections.

8. The blade assembly of claim 6 wherein the abutting surfaces of the tail section have solid face strips in which slots and insert splices are provided but the length of the tail sections are essentially made up of spaced apart walls connected by a honeycomb core material adhesively bonded between them.

9. A method of fabricating wind turbines having wood-resin composite, essentially hollow wind turbine blades comprising endwisely abutting blade sections of generally tear-drop cross section with generally curvilinear shaped in section, essentially hollow nose forming strips, and converging in section walls projecting therefrom forming essentially hollow tail sections connecting with the ends of the nose forming strips comprising:

machining the facial end walls of the abutting nose forming strips and converging tail forming walls of the blade sections to provide a precise alignment thereof providing a flush joint when the sections are butted together to extend longitudinally along an axis;

clamping the blades in abutting relation and spreading an adhesive resin on the facial end walls for adhesively resin bonding the facial end walls of the blade sections in longitudinal abutting relation, and permitting the resin to cure;

then cutting elongate axially communicating splice receiving slots with smooth surfaced side walls which extend from the abutting ends of the blades in perimetrally spaced relation in the perimeter of the abutting blade section walls, the slots in the mating sections being of a length at least eight times their width;

inserting and in situ adhesively resin bonding splice inserts which fit the slots and are flush with the perimeter of the blade sections in place in the slots; and securing the blades formed in place on a wind turbine shaft.

10. The method of claim 9 in which resin skin coats are applied to the blade sections except at the areas adjoining abutment in which the slots are cut and, after the splice inserts are inserted, a resin skin coat is applied to the said areas to acheive an overall skin coat.

11. A method of fabricating wind turbines having wood-resin composite, essentially hollow wind turbine blades comprising mating endwisely abutting blade sections of generally tear-drop cross-section with generally curvilinear shaped in section, essentially hollow, nose forming strips and converging, in section, walls projecting therefrom forming tail sections connecting with the ends of the nose forming strips comprising the steps of: clamping the blades in abutting relation to extend longitudinally along an axis while adhesively resin bonding the blade sections in longitudinal abutting relation and curing the resin bond; then cutting mating elongate longitudinally aligned splice receiving slots which extend from the abutting ends of the blades in perimetrally spaced relation in the perimeter of the bonded abutting blade section walls; then inserting, and in situ adhesively resin bonding, splice inserts which each fit a pair of the slots and are essentially flush with the perimeter of the blade sections in place in the slots; and securing the blades formed in place on a wind turbine shaft.

12. The method of claim 11 in which the slots are cut with opposite marginal surfaces which converge generally radially inwardly from said perimeters and the inserts have complementary convergent surfaces, and said inserts are inserted by tapping them into place to apply an adhesive bonding pressure.

13. The method of claim 11 in which the slots and inserts are diamond-shaped and the sides and ends of the slots and the inserts are relatively convergent.

14. The method of claim 11 in which slots in the nose forming strips are cut in more closely spaced relation at the ends adjoining the tail section.

15. The method of claim 11 in which the slots in the tail forming strips are cut in more closely spaced relation at the ends thereof remote from the nose section.

* * * * *